Aug. 16, 1932.   C. CARD   1,872,117
STUFFING BOX
Filed Aug. 27, 1930
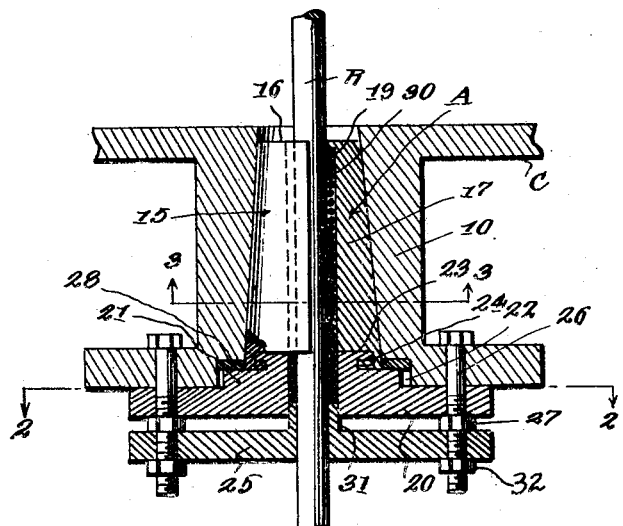
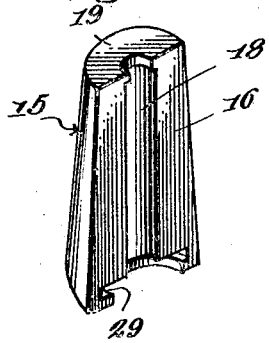
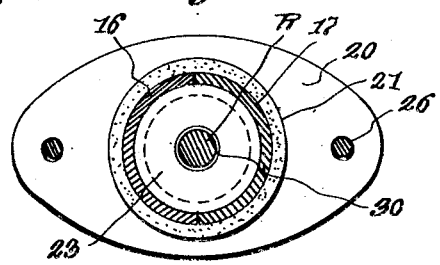
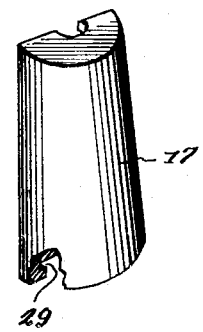
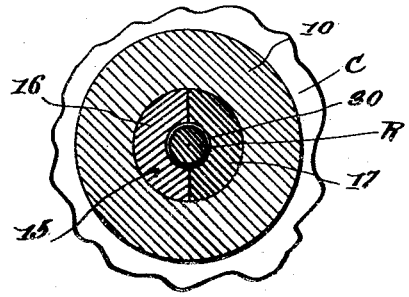
INVENTOR.
CHARLES CARD
BY
*Irving M. Cathran* ATTORNEY Patented Aug. 16, 1932

1,872,117

UNITED STATES PATENT OFFICE

CHARLES CARD, OF MERCED, CALIFORNIA

STUFFING BOX

Application filed August 27, 1930. Serial No. 478,229.

This invention appertains to packing glands and more particularly to a novel stuffing box particularly adapted for use in connection with piston rods.

One of the primary objects of my invention is to provide an improved stuffing box in which the packing can be readily and quickly removed when worn without injury to the piston rod and a new packing substituted therefor with the expenditure of a minimum amount of time and labor.

Another important object of my invention is to provide a stuffing box in which an effective seal is provided for preventing the escape of air or steam as the case may be, past the piston rod.

A still further object of my invention is to provide an improved stuffing box of the above character, which will be durable and efficient in use, one that will be simple and easy to manufacture, and one which can be placed upon the market and incorporated with a cylinder head and piston rod at a small cost.

With these and other objects in view, the invention consists in the novel construction, arrangement and formation of parts, as will be hereinafter more specifically described, claimed, and illustrated in the accompanying drawing, in which drawing:—

Figure 1 is a longitudinal section through my improved stuffing box.

Figure 2 is a transverse section through the same taken on the line 2—2 of Figure 1 looking in the direction of the arrows.

Figure 3 is a similar section taken on the line 3—3 of Figure 1 looking in the direction of the arrows.

Figure 4 is a detail perspective view of one section of the packing cage.

Figure 5 is a detail perspective view of the other section of the packing cage showing parts thereof broken away and in section.

Referring to the drawing in detail, wherein similar reference characters designate corresponding parts throughout the several views, the letter A generally indicates my improved stuffing box and by way of example I have shown the same associated with the head of a cylinder C through which extends the piston rod R.

The cylinder head C can be of any preferred or conventional character and includes the cylinder body or sleeve 10 for receiving the piston rod R. In accordance with my invention, the bore of the body 10 is tapered toward its inner end as shown.

My improved stuffing box A includes a removable cage 15 embodying a pair of like companion sections 16 and 17. Each of these sections 16 and 17 is provided on its inner face with a semi-cylindrical groove 18 for the piston rod. Thus when the sections 16 and 17 are placed together the groove 18 defines a longitudinally extending axially disposed bore. This bore is restricted at its inner end to provide a seat or shoulder 19, for a purpose, which will be later described.

The outer surface of the sections 16 and 17 of the cage 15 are tapered toward one end to conform to the bore of the body or sleeve 10 and the cage is adapted to be snugly received in said bore. In connection with the cage 15 I utilize an inner gland 20 and an outer gland 25. The inner gland 20 is placed against the outer face of the cylinder head and is provided with an axially disposed boss 21 received in an annular groove 22 formed in the cylinder head. This boss 21 is provided with a reduced axial extension 23 having its face undercut as at 24 to provide a seat, as will be later described. The inner gland 20 is provided with an axial bore of substantially the same size as the bore of the cage 15 and this bore likewise receives the piston rod. Suitable bolts 26 are employed for receiving the glands 20 and 25 and the gland 20 is held in intimate contact with the cylinder head by means of nuts 27. A packing washer or gasket 28 is interposed between the boss 21 of the gland 20 and the inner wall of the groove 22 and this packing washer or gasket prevents the escape of steam or air, as the case may be between the glands and the cylinder head. It is to be also noted that the packing washer engages the outer surface of the cage 15. The inner faces of the sections 16 and 17 of the cage adjacent to the outer ends thereof are provided with semi-circular grooves 29 for receiving the annular rib on the extension 23 defined by the groove 24. Thus it is to be noted that the cage is carried directly by the gland 20 and that when the gland 20 is removed from the cylinder head that the cage will be carried therewith.

The bore of the cage receives the packing 30 which is confined therein by the seat 19 at the inner end of said cage and this packing fits around the piston rod for precluding the passage of steam or air past the piston rod. The outer gland 25 is placed on the bolt 26 and is provided with an extension sleeve 31 for slidably fitting within the bore of the inner gland 20. Nuts 32 can be threaded on the bolt 26 into contact with the outer gland which forces the sleeve 31 into engagement with the packing 30 for bringing the same into proper engagement with said piston rod.

When the packing becomes worn, it is merely necessary to remove the glands 25 and 20, which, as stated, will pull the cage 15 from out of cylinder. The packing 30 will be removed with the cage and it is obvious that by separating the sections 16 and 17 of the cage that the cage can be readily removed from the gland 20 and the worn packing renewed, after which the cage can again be assembled on the gland 20 and pushed back in their seat.

From the foregoing description, it can be seen that I have provided a stuffing box of exceptionally simple and durable character, in which the packing can be readily and quickly renewed with the expenditure of a minimum amount of time and effort.

Changes in details may be made without departing from the spirit or the scope of this invention, but:—

What I claim as new is:

1. The combination with a cylinder head having a cylindrical body provided with a tapered bore, and a piston rod movable through said bore, of a cage including a pair of companion sections having their outer faces tapered toward one end and removably fitted in said bore, the sections of the cage surrounding the piston rod, a packing for the piston rod carried by the cage, a gland, means adjustably and detachably connecting the gland with the cylinder head, the gland having an extension provided with an annular rib, the inner faces of the sections of the cage being provided with a semi-circular groove receiving the rib, and a packing washer interposed between the gland and the body and surrounding the cage for holding the rib of the gland and said groove in interfitting relation.

2. The combination with a cylinder head having a cylindrical body provided with a tapered bore, and a piston rod movable through said bore, of a cage including a pair of companion sections having their outer faces tapered toward one end and removably fitted in said bore, the sections of the cage surrounding the piston rod, a packing for the piston rod carried by the cage, a gland, means adjustably and detachably connecting the gland with the cylinder head, the gland having an extension provided with an annular rib, the inner faces of the sections of the cage being provided with a semi-circular groove receiving the rib for locking said cage and gland together, a packing washer interposed between the gland and the body and surrounding the cage, and a second gland adjustable toward and away from the first gland having a cylindrical extension for engagement with the packing.

In testimony whereof I affix my signature.

CHARLES CARD.